United States Patent
Rakshit et al.

(10) Patent No.: US 12,085,930 B2
(45) Date of Patent: Sep. 10, 2024

(54) AI-ENABLED PROCESS RECOVERY IN MANUFACTURING SYSTEMS USING DIGITAL TWIN SIMULATION

(71) Applicant: International Business Machines Corporation, Armonk, NY (US)

(72) Inventors: Sarbajit K. Rakshit, Kolkata (IN); Laxmikantha Sai Nanduru, Secunderabad (IN); Pritpal S. Arora, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/568,776

(22) Filed: Jan. 5, 2022

(65) Prior Publication Data

US 2023/0213930 A1   Jul. 6, 2023

(51) Int. Cl.
G05B 23/02   (2006.01)
G05B 19/418   (2006.01)

(52) U.S. Cl.
CPC ..... *G05B 23/0294* (2013.01); *G05B 19/4183* (2013.01); *G05B 19/4184* (2013.01); *G05B 23/0243* (2013.01)

(58) Field of Classification Search
CPC ............ G05B 23/0294; G05B 19/4183; G05B 19/4184; G05B 23/0243; G05B 17/02; G05B 23/024
See application file for complete search history.

(56) References Cited

U.S. PATENT DOCUMENTS

| | | | |
|---|---|---|---|
| 9,400,490 | B2 | 7/2016 | Turolla |
| 11,403,541 | B2 | 8/2022 | Thomsen |
| 2018/0196409 | A1* | 7/2018 | Ben-Bassat ............ G06Q 10/06 |
| 2019/0138333 | A1* | 5/2019 | Deutsch ............ G06Q 10/0631 |
| 2020/0265329 | A1* | 8/2020 | Thomsen ............... G06N 5/048 |
| 2022/0138376 | A1* | 5/2022 | Li ........................... G06F 30/20 703/7 |

(Continued)

FOREIGN PATENT DOCUMENTS

| | | |
|---|---|---|
| CN | 111562769 A | 8/2020 |
| CN | 110442936 B | 2/2021 |

(Continued)

OTHER PUBLICATIONS

"How the Internet of Things is Making the Manufacturing Industry Smarter?", Group50, SlideShare, Feb. 7, 2019, 10 pages, <https://www.slideshare.net/group50consulting/how-the-internet-of-things-is-making-the-manufacturing-industry-smarter>.

(Continued)

*Primary Examiner* — Christopher W Carter
(74) *Attorney, Agent, or Firm* — Monchai Chuaychoo

(57) ABSTRACT

An approach for providing solutions to ad in the process recovery in manufacturing systems to resume manufacturing activity is disclosed. The outcome of the approach can include the following advantages, minimizing waste, reducing cost of recovery, and increasing efficiency in a manufacturing process. The approach includes collecting initial factory data; identifying and categorizing one or more shop floor activities; determining initial recovery process; creating a digital twin copy of the factory; performing one or more initial simulation scenarios; generating factory improvement plan; and executing factory improvement plan.

20 Claims, 4 Drawing Sheets

(56) References Cited

U.S. PATENT DOCUMENTS

| | | | |
|---|---|---|---|
| 2022/0197246 A1* | 6/2022 | Cella | B25J 9/1697 |
| 2022/0269259 A1* | 8/2022 | Albrecht | G06Q 50/04 |

FOREIGN PATENT DOCUMENTS

| | | | |
|---|---|---|---|
| DE | 102019119352 A1 | 1/2021 | |
| KR | 1020200045924 A | 5/2020 | |
| TW | 202113742 A | 4/2021 | |
| WO | 2020264095 A1 | 12/2020 | |
| WO | 2021008782 A1 | 1/2021 | |

OTHER PUBLICATIONS

"Self-Sustaining Manufacturing Systems Can Even Repair Themselves", Innovation Toronto, downloaded from internet on Oct. 21, 2021, 4 pages, <https://innovationtoronto.com/2017/10/self-sustaining-manufacturing-systems-can-even-repair-themselves/>.

Andersson et al., "Restarting Manufacturing Systems; Restart States and Restartability", IEEE Transactions on Automation Science and Engineering, vol. 7, No. 3, Jul. 2010, DOI: 10.1109/TASE.2009.2034136, pp. 486-499.

Cinar et al., "Machine Learning in Predictive Maintenance towards Sustainable Smart Manufacturing in Industry 4.0", Sustainability 2020, 12, 8211, Published Oct. 5, 2020, doi:10.3390/su12198211, 42 pages.

Cohen et al., "Design and management of digital manufacturing and assembly systems in the Industry 4.0 era", The International Journal of Advanced Manufacturing Technology (2019), Published online Nov. 18, 2019, 13 pages.

Rojek et al., "Digital Twins in Product Lifecycle for Sustainability in Manufacturing and Maintenance", Applied Sciences 2021, 11, 31, Published Dec. 23, 2020, 19 pages.

Stojanovic et al., "PREMIuM: Big Data Platform for Enabling Self-healing Manufacturing", 2017 International Conference on Engineering, Technology and Innovation, DOI: 10.1109/ICE.2017.8280060, pp. 1501-1508.

Tao et al., "Digital Twin Shop-Floor: A New Shop-Floor Paradigm Towards Smart Manufacturing", Special Section on Key Technologies for Smart Factory of Industry 4.0, date of current version Oct. 25, 2017, DOI 10.1109/ACCESS.2017.2756069, 11 pages.

\* cited by examiner

AI-ENABLED PROCESS RECOVERY IN MANUFACTURING SYSTEMS USING DIGITAL TWIN SIMULATION

BACKGROUND

The present invention relates generally to the field of manufacturing, and more particularly to stage recovery of different manufacturing processes as soon as possible, when breakdowns or issues occur and increase efficiency and reduce waste and cost.

Manufacturing process comprises of numerous activities—sequential and/or parallel in the end-to-end cycle. While performing any mechanical activity on an industrial shop floor in a manufacturing plant, there can be various types of failures for varied reasons. The mechanical activity can fail because of a problem with the machinery, power failure, stoppage of feed or faulty input materials etc. If an activity has failed, then a manual or automated system recovers the process from the failure by resuming the activity from the point of failure or from the beginning of it, based on the activity specification. In a manufacturing plant, various sets of activities may be performed with/by various machineries, and such activities can have different probabilities of failures or defect/error rates.

In the current generation of manufacturing systems, Computer Aided Manufacturing (CAM), Computer Aided Engineering (CAE) and Computer Integrated Manufacturing (CIM) are currently limited to performing routine activities using automation, with programs or sub-routines written to perform a set of mechanical or robotic tasks. The use of computer methods is also to support basic error checking, analysis, manufacturability etc., of a product design.

SUMMARY

Aspects of the present invention disclose a computer-implemented method, a computer system, and computer program product for staging recovery when failures occur during intermediary stages of manufacturing or building products; this inline paves way to minimizing waste, reducing cost and increasing efficiency in a manufacturing process. The computer implemented method may be implemented by one or more computer processors and may include, collecting initial factory data; identifying and categorizing one or more shop floor activities; determining manufacturing sequences, determining initial recovery process; creating a digital twin copy of the factory along with the manufacturing machineries and units; performing one or more initial simulation scenarios; generating factory improvement plans; and executing factory improvement plans.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
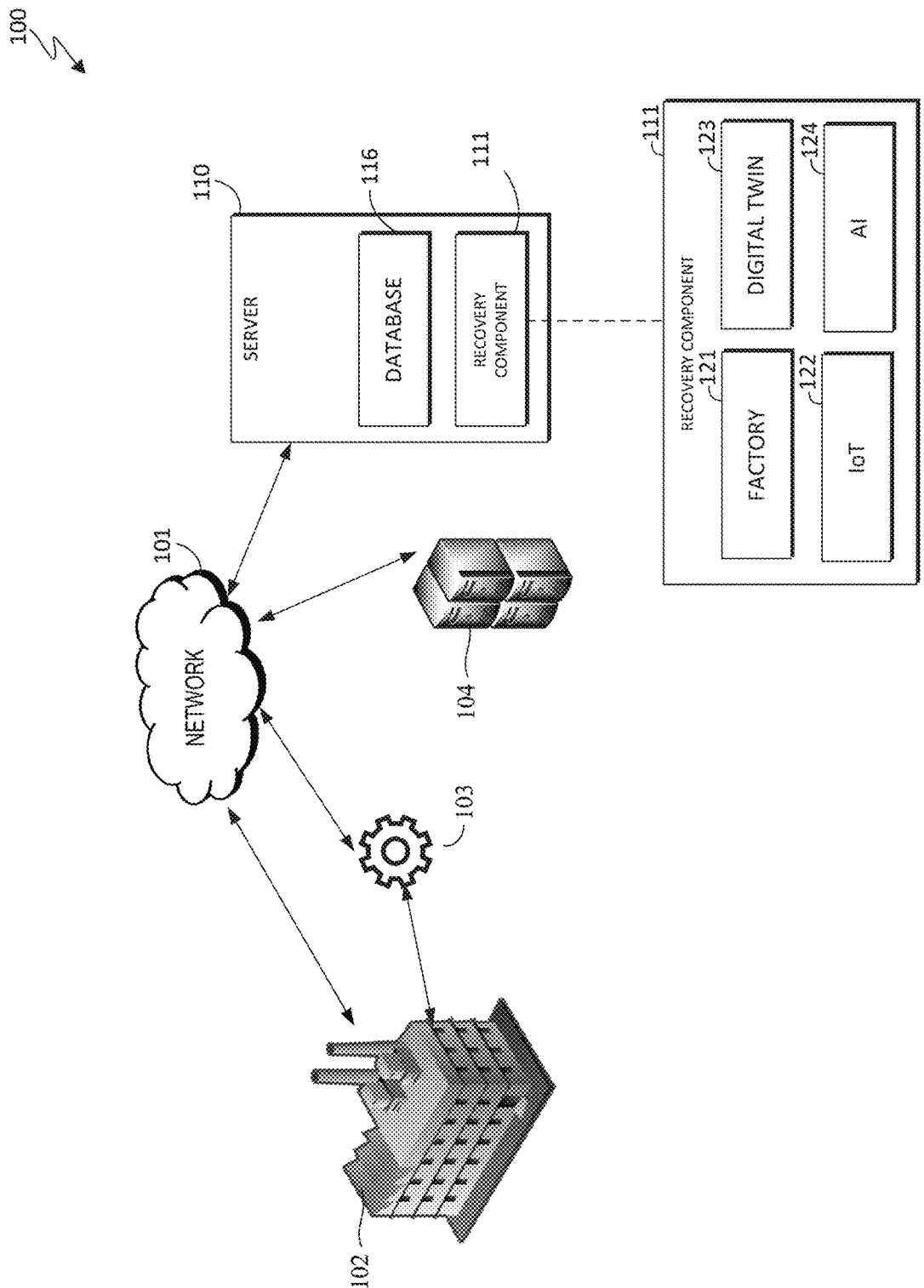
FIG. 1 is a functional block diagram illustrating a manufacturing environment, designated as 100, in accordance with an embodiment of the present invention.

The current state of art as it pertains to manufacturing, specifically with computer-aided system can present some challenges. Generally, this means that a manufacturing system will be able not only to react on a problem at hand, but also rather to sense the problem (in advance) and proactively resolve the situation (via actions identified with AI, machine learning on the various diagnosis of the faults on the machine failure scenarios). For example, one challenge may involve the lack of cognitive level and intelligence for the system to identify the level of defects and take remedial actions or initiate mechanical tasks to recover from failed activities. Thus, while initiating various activities on various machines in a manufacturing system, user needs to consider, evaluate and assess a) the chances of failure of the activities, and b) while the activities are in progress, the capability of recovering failed activities in different machine subsystems. Where the distribution of activities to machinery is improperly sequenced or planned, and there is there is significant heterogeneity in the activities, or there are dependencies not met for the preceding activities; in such cases the manufacturing process or sub-process may not complete successfully.

Embodiments of the present invention recognize the deficiencies in the current state of art as it relates to a lack of intelligence in the manufacturing process and provides an approach. The approach develops and builds self-recovering (or self-healing) manufacturing systems by leveraging the use of a digital twin computing to simulate/model the manufacturing process and various failure scenarios on a virtual environment. Self-adaptive manufacturing systems will be able to resolve the problems with the existing equipment and machinery in an autonomous way (i.e., self-healing).

What is digital twin computing? Digital twin computing technology leverages IoT, artificial intelligence (i.e., leveraging machine/deep learning) and software analytics to create living digital simulation models that update and change as their physical counterparts change. A digital twin continuously learns and updates itself to represent its near real-time status. A digital twin also integrates historical data from past usage to factor into its digital model. What is a simulation? A simulation is an approximation of a process and/or a system (e.g., machines, etc.). Furthermore, simulations are run in virtual environments that may be representations of physical environments but do not integrate real-time data (i.e., used by digital twin computing). The main difference between a simulation (and/or modeling) versus a digital twin is that a digital twin can use real-time data based on the regular transfer of information between the digital twin and its corresponding physical environment.

Some embodiments of the present invention provide an approach that leverages an AI-enabled process recovery in manufacturing systems by using digital twin simulation. Furthermore, same embodiments allow a step of enabling digital twin simulation of the mechanical activities, various machinery and subsystems to assess activity failures and associated recovery models with detailed steps of the execution, creating maps of the machinery, tasks, failures, and recovery models.

Some embodiments of the present invention provide an approach that leverages the use of AI driven machine learning and creation of a historical knowledge corpus to identify different types of failures of the activities, various influencing factors, and the recovery steps, identification of the capabilities of machinery or subsystems and its related dependencies to reassign the failed activities for recovery.

Some embodiments of the present invention provide an approach that can leverage a predictive model to predict the probability of failures of activities and associated machines and subsystems so recovery can be planned.

Some embodiments of the present invention provide an approach wherein, based on the prediction of failures, recommending what types of recovery capabilities are to be added to various machinery or subsystems so that the reassigned failed activities can be recovered.

Some embodiments of the present invention provide an approach that discloses a step to detect faulty machines and subsystems beyond repair and initiate replacement to stage the process recovery with new units.

Some embodiments of the present invention that provide an approach discloses a step to detect unusable intermediate parts in the manufacturing cycle for recycling and minimizing the wastage.

Some embodiments of the present invention provide an approach that discloses a step wherein, while reassigning the activities, analyzing the rate of recovery of the activity by different machinery or subsystems, and accordingly splitting the activity and distributing it or parallelizing sequences among multiple machines so that the aggregated recovery time can be minimized.

Some embodiments of the present invention provide an approach that discloses a step of tracking the actual activity failures, recovery times and accordingly dynamically redistributing the activities to different machinery or subsystems, so as to ensure quicker overall completion time of all activities.

Some embodiments provides another approach for staging recovery when failures occur during intermediary stages of manufacturing or building products; this inline paves way to minimizing waste, reducing cost and increasing efficiency in a manufacturing process.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a manufacturing environment, designated as 100, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Manufacturing environment 100 includes network 101, factory 102, IoT devices 103 and digital twin server 104.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, factory 102, IoT devices 103, digital twin server 104 and other computing devices (not shown) within manufacturing environment 100. It is noted that other computing devices can include, but is not limited to, IoT devices 103 and any electromechanical devices capable of carrying out a series of computing instructions.

Factory 102 an industrial site, populated with machinery, where workers operate machines to produce various products and goods. Factory 102 may include computing guidance (e.g., computing ecosystems, programming logic controllers, etc.) to assist with efficient production and reduction in waste.

IoT devices 103 can be any smart device (e.g., thermal sensors/imaging, wireless camera and microphones) that can detect real world sensory information. Furthermore, IoT devices 103 can also include wearable smart devices, smart phones, smart sensors or any other devices associated with a manufacturing infrastructure.

Digital twin server 104 can be servers used to simulate the digital twin of a manufacturing environment 100. Digital twin server 104 can communicate with IoT devices 103 and factory 102 to update various simulation scenarios including modeling.

Server 110 and/or digital twin server 104 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within manufacturing environment 100 via network 101. In another embodiment, server 110 represents a computing system utilizing clustered computers and components (e.g., database server computers, application server computers, etc.) that act as a single pool of seamless resources when accessed within manufacturing environment 100.

Embodiment of the present invention can reside on server 110 or digital twin server 104. Server 110 includes recovery component 111 and database 116.

Recovery component 111 provides the capability to develop and build self-recovering manufacturing systems. Recovery component 111 contains subcomponents (see FIG. 1): factory component 121, IoT component 122, digital twin component 123 and AI component 124.

As is further described herein below, factory component 121 of the present invention provides the capability of managing information, send, and receive information and interfacing the machinery ecosystems associated with a manufacturing facility (i.e., factory 102). Factory information can include, but it is not limited to, activity in the end-to-end manufacturing system and shop floor activities being performed. Shop floor activities can include, but it is not limited to, assembly line activities performed by individual workers on each machine, maintenance of machines on the shop floor, loading raw materials into the machines and unloading finished goods at far end machine of the process.

As is further described herein below, IoT component 122 of the present invention provides the capability of managing sensors and IoT devices on the factory floor. IoT component 122 is able to send and receive information data from the sensors and IoT devices.

As is further described herein below, digital twin component 123 of the present invention provides the capability of interfacing with a digital twin server (i.e., 104). Digital twin component 123 is capable of running various scenarios to optimize the manufacturing process. Scenarios can include digital twin simulation of the mechanical activities, various machinery and subsystems to assess activity failures and associated recovery models with detailed steps of the execution; creating maps of the machinery, tasks, failures, and recovery models.

As is further described herein below, AI component 124 of the present invention provides the capability of analyzing data from the simulations and making recommendations. Other capabilities of AI component 124 can include the following features and/or functionality: (i) machine learning and creation of a historical knowledge corpus to identify different types of failures of the activities, various influencing factors and the recovery steps; identification of the capabilities of machinery or subsystems to reassign the failed activities for recovery, (ii) predictive model to predict the probability of failures of activities and associated machines and subsystems so recovery can be planned, (iii) based on the prediction of failures, recommending what types of recovery capabilities are to be added to various machinery or subsystems so that the reassigned failed activities can be recovered, (iv) detect faulty machines and subsystems beyond repair and initiate replacement to stage the process recovery with new units, (v) detect unusable intermediate parts in the manufacturing cycle for recycling and minimizing the wastage, (vi) while reassigning the activities, analyzing the rate of recovery of the activity by different machinery or subsystems, and accordingly splitting the activity and distributing it among multiple machines so that the aggregated recovery time can be minimized and (vii) tracking the actual activity failures, recovery times and accordingly dynamically redistributing the activities to different machinery or subsystems, so as to ensure quicker overall completion time of all activities.

Database 116 is a repository for data used by recovery component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within manufacturing environment 100, provided that recovery component 111 has access to database 116. Database 116 may store information associated with, but is not limited to, knowledge corpus, activity in the end to end manufacturing system and shop floor activities being performed, factors (including failures) that can affect the activity, history analysis of activities, various scenarios and simulations of activities for digital twin server, machinery on the shop floor including their specifications, all production steps for each goods produced, information related to the all workers who operate various machinery, maintenance history on all machinery, weather conditions/patterns and interior conditions of the shop floor.

Figure 2:
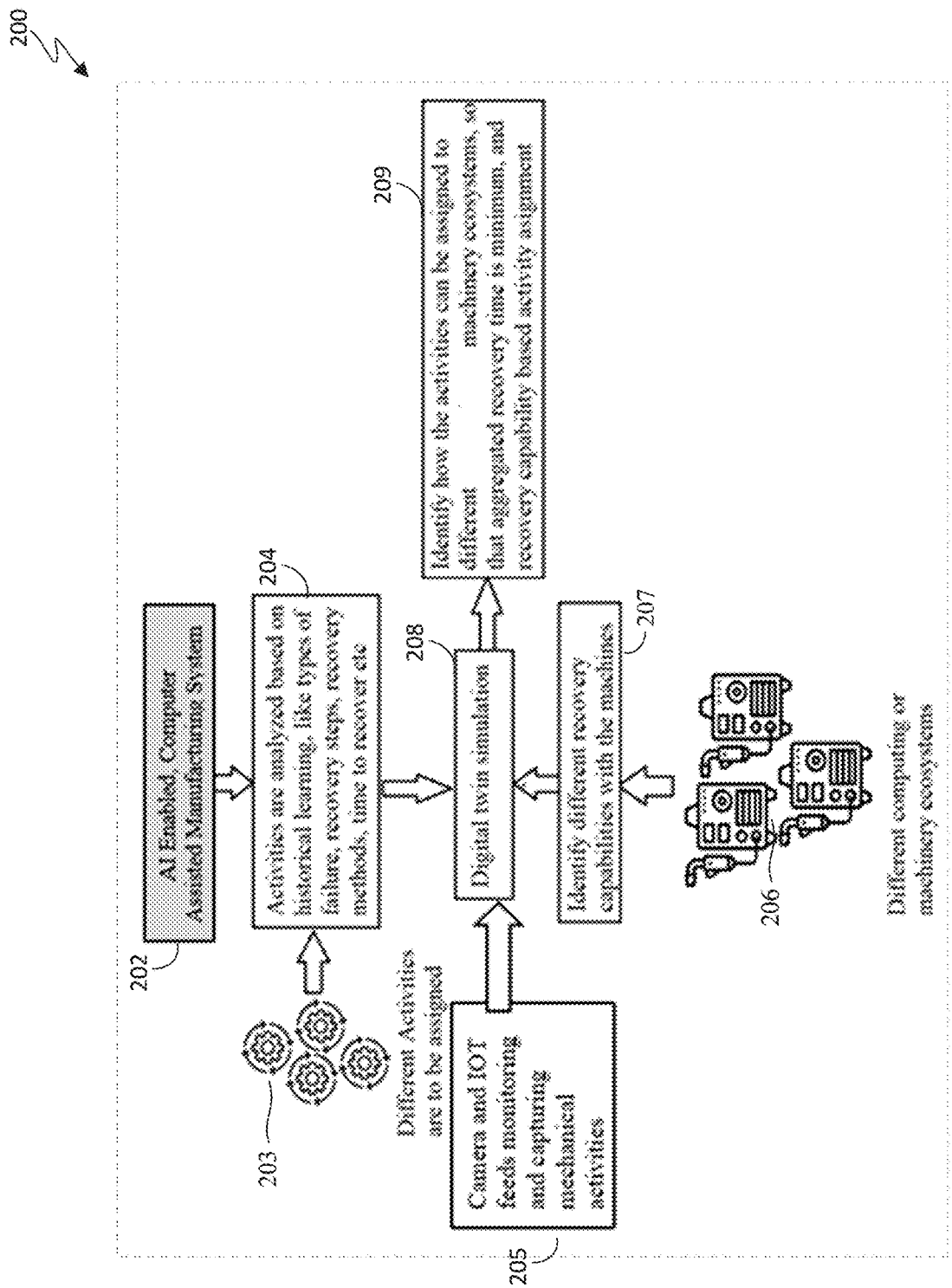
FIG. 2 is a diagram illustrating a process flow, designated as 200, wherein various activities are performed, various machinery performing those activities, a digital twin simulation of the activities and the machine systems, and how the proposed system will identify the activities to be re-assigned in case of failures, so the aggregated recovery time is minimized in the manufacturing system, in accordance with an embodiment of the present invention.

FIG. 2 is a diagram illustrating a process flow, designated as 200, wherein various activities are performed, various machinery performing those activities, a digital twin simulation of the activities and the machine systems, and how the proposed system can identify the activities to be re-assigned in case of failures, so the aggregated recovery time is minimized in the manufacturing system, in accordance with an embodiment of the present invention.

There are several inputs in the process flow, such as block 202, block 203, block 205 and block 206. Block 202 designates an AI system component. Block 203 designates an input from other different activities in manufacturing that is not covered by block 205 and block 206. Block 205 designates inputs from camera and IoT devices that are used to capture mechanical activities. Block 204 designates a process of analyzing inputs from block 203 and block 202. Block 204 may use analytical techniques such as historical learning or any other machine learning technique to understand the activities, which may include failure, recovery steps, time to recover, etc.

Block 206 designates inputs from different computing or machinery ecosystems. Output from block 206 is used as inputs for block 207. Block 207 designates a process of identifying recovery capabilities with the machine ecosystems. These various inputs feed into block 208, which designates a digital twin simulation (i.e., running a simulation of factory based on various inputs). After the simulation has completed, a list of recommendations is determined in block 209. Block 209 is a process of analyzing results from the simulation.

Figure 3:
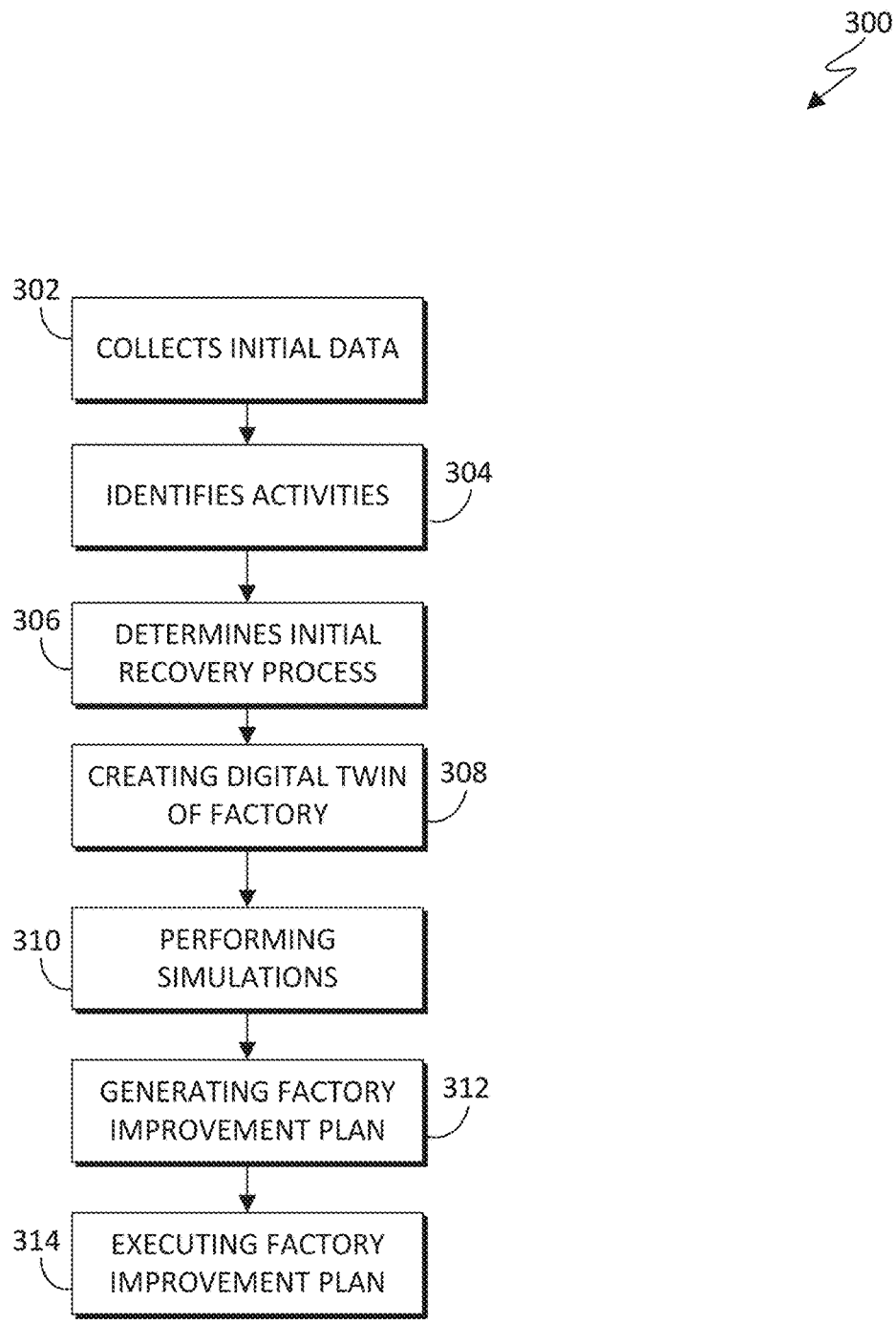
FIG. 3 is a high-level flowchart illustrating the operation of recovery component 111, designated as 300, in accordance with another embodiment of the present invention.

FIG. 3 is a high-level flowchart illustrating the operation of recovery component 111, designated as 300, in accordance with an embodiment of the present invention.

Recovery component 111 collects initial factory data (step 302). In an embodiment, recovery component 111, through factory component 121 and IoT component 122, collects initial factory data. For example, factory data can include information from IoT devices and various types of camera feeds with image and video analytics can record each activity in the end-to-end manufacturing system. Each activity will be uniquely identified, recorded, and assessed on how it is being performed.

Recovery component 111 identifies and categorizing one or more shop floor activities (step 304). In an embodiment, recovery component 111 continually gathers info on the shop floor activities being performed. It records and analyzes which activities have failed and how (the reason for failures of the activities; these may also be human operator validated and updated in some cases) to build a historical knowledge corpus. Failure details of the activities will be classified to identify reasons of failures as well as the machines associated with those activities.

A manufacturing process may have several activities (sequential and/or parallel). Each activity can have multiple steps and embodiments can create a mapping of different types of failures in different steps of the activity and associated machinery or machine subsystems.

Recovery component 111 determines initial recovery for the manufacturing process (step 306). In an embodiment, recovery component 111, through AI component 124, identifies various influencing factors which can affect the activities and could be causes for failures. Based on the historical analysis of the activity failures, embodiments can analyze how the activities can be recovered. Based on the historical recovery records, embodiment can identify the recovery rate and time required to perform the process/activity recovery. Embodiment can also predict the types of failures that can occur in the activities using machine learning 'Classification and Regression Trees/Random Forests' algorithms.

Recovery component 111 creates a digital twin copy of the factory (step 308). In an embodiment, recovery component 111, through AI component 124 and digital twin component 123, creates a digital copy of the factory including all activities, processes.

Recovery component 111 performs one or more simulation scenarios (step 310). In an embodiment, recovery component 111, through AI component 124 and digital twin component 123, performs one or more digital simulations of the machines to identify the recovery capabilities of the machines and subsystems. Recovery component 111 can perform the following, but is not limited to, (i) identify machinery or subsystems where the activities to be recovered are performed, (ii) identifying the set of activities to be performed by various machinery or subsystems, (iii) detecting faulty machines or subsystems that are beyond repair and initiate replacements and (iv) detecting intermediary parts that are unusable from a failed activity and will recycle them as raw materials to minimize wastage in the manufacturing cycle v) Initiate procurement of the faulty parts.

Recovery component 111 generates one or more factory improvement plan (step 312). In an embodiment, recovery component 111, through AI component 124 and digital twin component 123, generates improvement plans to address scenarios from the simulation. For example, recovery component 111 can recommend a recovery activity with newly machine or subsystems to address faulty machine or subsystems that are beyond repair.

Recovery component 111 executing the one or more factory improvement plan (step 314). In an embodiment, recovery component 111 can commence recovery activities based on the factory improvement plan. For example, may reassign and initiate the activities on various machinery or subsystems based on their recovery capabilities. Furthermore, if those activities have multiple failures in multiple steps, then those activities can be split and assigned to different machinery or subsystems. Or embodiments can reassign the activities in such a way that the aggregated recovery time is minimized and the completion time of the activities is shortened.

Figure 4:
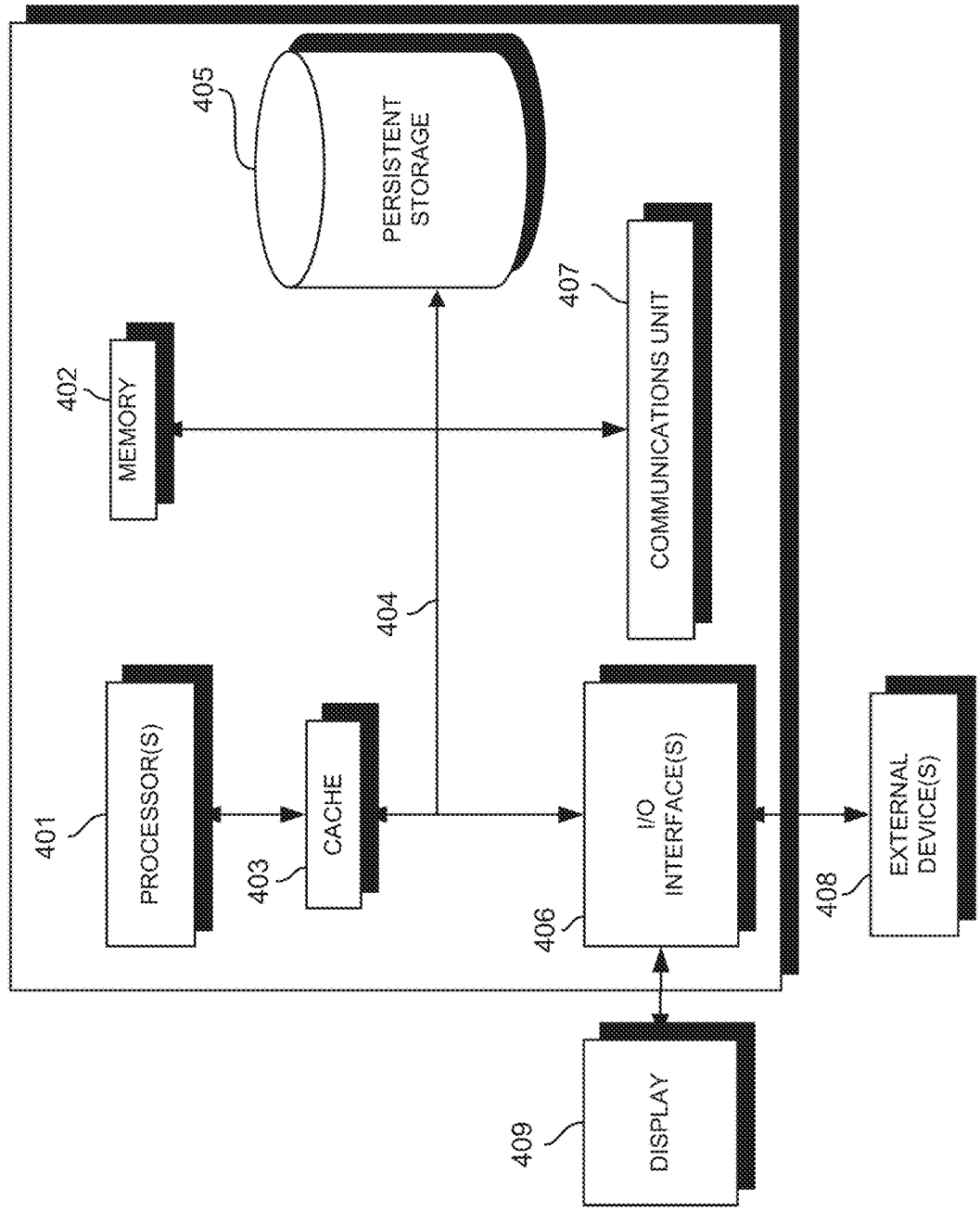
FIG. 4 depicts a block diagram, designated as 400, of components of a server computer capable of executing the recovery component 111 within the manufacturing environment 100, in accordance with an embodiment of the present invention.

FIG. 4, designated as 400, depicts a block diagram of components of recovery component 111 applications, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data ×10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Recovery component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., recovery component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., recovery component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the proposed concept may be summarized in a nutshell in the following clauses:

1. Digital twin simulation of the mechanical activities, various machinery and subsystems to assess activity failures and associated recovery models with detailed steps of the execution; creating maps of the machinery, tasks, failures, and recovery models.
2. AI driven machine learning and creation of a historical knowledge corpus to identify different types of failures of the activities, various influencing factors and the recovery steps; identification of the capabilities of machinery or subsystems to reassign the failed activities for recovery.
3. A predictive model to predict the probability of failures of activities and associated machines and subsystems so recovery can be planned.
4. Based on the prediction of failures, recommending what types of recovery capabilities are to be added to various machinery or subsystems so that the reassigned failed activities can be recovered.
5. Detect faulty machines and subsystems beyond repair and initiate replacement to stage the process recovery with new units.
6. Detect unusable intermediate parts in the manufacturing cycle for recycling and minimizing the wastage.
7. While reassigning the activities, analyzing the rate of recovery of the activity by different machinery or subsystems, and accordingly splitting the activity and distributing it among multiple machines so that the aggregated recovery time can be minimized.
8. Tracking the actual activity failures, recovery times and accordingly dynamically redistributing the activities to different machinery or subsystems, so as to ensure quicker overall completion time of all activities.
9. IOT and various types of camera feeds with image and video analytics will record each and every activity in the end to end manufacturing system. Each activity will be uniquely identified, recorded and assessed on how it is being performed.
10. The proposed system continually gathers info on the shop floor activities being performed. It records and analyzes which activities have failed and how (the reason for failures of the activities; these may also be human operator validated and updated in some cases) to build a historical knowledge corpus.
11. Failure details of the activities will be classified to identify reasons of failures as well as the machines associated with those activities.
12. A manufacturing process will have several activities (sequential and/or parallel). Each activity can have multiple steps and the proposed system will be creating a mapping of different types of failures in different steps of the activity and associated machinery or machine subsystems.
13. The proposed system will be identifying various influencing factors which can affect the activities and could be causes for failures.
14. Based on the historical analysis of the activity failures, the proposed system will be analyzing how the activities can be recovered.
15. Based on the historical recovery records, the proposed system will be identifying the recovery rate and time required to perform the process/activity recovery.
16. The proposed system will be predicting the types of failures that can occur in the activities using 'Classification and Regression Trees/Random Forests' algorithms.
17. The digital twin system will be performing digital simulation of the machines to identify the recovery capabilities of the machines and subsystems. The proposed system will identify machinery or subsystems where the activities to be recovered are performed.
18. The proposed system will be identifying the set of activities to be performed by various machinery or subsystems.
19. The proposed system will detect faulty machines or subsystems that are beyond repair and initiate replacements and then stage recovery of the activities with newly machines or subsystems.
20. The proposed system will detect intermediary parts that are unusable from a failed activity and will recycle them as raw materials to minimize wastage in the manufacturing cycle.
21. The proposed system will then reassign and initiate the activities on various machinery or subsystems based on their recovery capabilities.

22. The proposed system will be identifying if any activity can have multiple failures in multiple steps, and accordingly be identifying if the activity can be split and assigned to different machinery or subsystems.

23. The proposed system will be reassigning the activities in such a way that the aggregated recovery time is minimized and the completion time of the activities is shortened.

What is claimed is:

1. A computer-implemented method for providing solutions to self-recovery in a manufacturing process, the computer-method comprising:
   collecting an initial factory data;
   identifying and categorizing one or more shop floor activities;
   creating a digital twin copy of the factory;
   detecting a failure in the manufacturing process;
   in response to detecting a failure in the manufacturing process, determining an initial recovery process;
   performing one or more initial simulation scenarios with the digital twin copy, wherein the one or more initial simulation scenarios includes an initial recovery process;
   generating one or more initial factory recovery plans based on the one or more initial recovery process and the one or more initial simulation scenarios;
   executing the one or more factory recovery plans;
   collecting a subsequent factory data;
   updating the digital twin copy of the factory based on the subsequent factory data;
   performing one or more subsequent scenarios based on the subsequent factory data; and
   creating one or more subsequent factory recovery plans based on the one or more subsequent scenarios; and
   executing a first recovery plan and a second recovery plan of the one or more subsequent factory recovery plans, wherein the second recovery plan comprising:
      detecting faulty machines or subsystems that are beyond repair; and
      initiating replacements of the faulty machine or subsystems.

2. The computer-implemented method of claim 1, the one or more initial factory recovery plans further comprises, i) tracking the actual activity failures, recovery times and accordingly dynamically redistributing the activities to different machinery or subsystems, so as to ensure quicker overall completion time of all activities and ii) staging recovery when failures occur during intermediary stages of manufacturing or building products.

3. The computer-implemented method of claim 1, wherein the initial factory data further comprises information from IoT (Internet of Things) devices and image and video analytics from an activity in the manufacturing process.

4. The computer-implemented method of claim 1, wherein the one or more shop floor activities further comprises assembly line activities performed by individual workers on each machine, maintenance of machines on the shop floor, loading raw materials into the machines and unloading finished goods at far end machine of the process.

5. The computer-implemented method of claim 1, wherein a first recovery plan of the one or more subsequent factory recovery plans comprises of analyzing the rate of recovery of the activity by different machinery or subsystems, and accordingly splitting the activity and distributing it or parallelizing sequences among multiple machines so that the aggregated recovery time can be minimized.

6. The computer-implemented method of claim 1, wherein determining initial recovery process further comprises:
   identifying factors which can affect the shop floor activities and causes for failures;
   analyzing the failures based on historical data associated with the shop floor activities; and
   predicting the failures using classification and regression trees/random forest algorithm.

7. The computer-implemented method of claim 1, wherein the one or more initial simulation scenarios further comprises, identify machinery or subsystems where the activities to be recovered are performed, identifying the set of activities to be performed by various machinery or subsystems, and detecting intermediary parts that are unusable from a failed activity and the intermediary parts will recycle as raw materials.

8. A computer program product for providing solutions to self-recovery in a manufacturing process, the computer program product comprising:
   one or more computer readable storage media and program instructions stored on the one or more computer readable storage media, the program instructions comprising the steps of:
   collecting an initial factory data;
   identifying and categorizing one or more shop floor activities;
   creating a digital twin copy of the factory;
   detecting a failure in the manufacturing process;
   in response to detecting a failure in the manufacturing process, determining an initial recovery process;
   performing one or more initial simulation scenarios with the digital twin copy, wherein the one or more initial simulation scenarios includes an initial recovery process;
   generating one or more initial factory recovery plans based on the one or more initial recovery process and the one or more initial simulation scenarios;
   executing the one or more factory recovery plans;
   collecting a subsequent factory data;
   updating the digital twin copy of the factory based on the subsequent factory data;
   performing one or more subsequent scenarios based on the subsequent factory data;
   creating one or more subsequent factory recovery plans based on the one or more subsequent scenarios; and
   executing a first recovery plan and a second recovery plan of the one or more subsequent factory recovery plans, wherein the second recovery plan comprising:
      detecting faulty machines or subsystems that are beyond repair; and
      initiating replacements of the faulty machine or subsystems.

9. The computer program product of claim 8, wherein the one or more initial factory recovery plans further comprises, i) tracking the actual activity failures, recovery times and accordingly dynamically redistributing the activities to different machinery or subsystems, so as to ensure quicker overall completion time of all activities and ii) staging recovery when failures occur during intermediary stages of manufacturing or building products.

10. The computer program product of claim 8, wherein the initial factory data further comprises information from IoT devices and image and video analytics from an activity in the end-to-end manufacturing system.

11. The computer program product of claim 8, wherein the one or more shop floor activities further comprises assembly line activities performed by individual workers on each machine, maintenance of machines on the shop floor, loading raw materials into the machines and unloading finished goods at far end machine of the process.

12. The computer program product of claim 8, wherein a first recovery plan of the one or more subsequent factory recovery plans comprises of analyzing the rate of recovery of the activity by different machinery or subsystems, and accordingly splitting the activity and distributing it or parallelizing sequences among multiple machines so that the aggregated recovery time can be minimized.

13. The computer program product of claim 8, wherein program instructions to determine initial recovery process further comprises:
   identifying factors which can affect the shop floor activities and causes for failures;
   analyzing the failures based on historical data associated with the shop floor activities; and
   predicting the failures using classification and regression trees/random forest algorithm.

14. The computer program product of claim 8, wherein the one or more initial simulation scenarios further comprises, identify machinery or subsystems where the activities to be recovered are performed, identifying the set of activities to be performed by various machinery or subsystems and detecting intermediary parts that are unusable from a failed activity and will recycle them as raw materials to minimize wastage in the manufacturing cycle.

15. A computer system for providing solutions to self-recovery in a manufacturing process, the computer system comprising:
   one or more computer processors;
   one or more computer readable storage media; and
   program instructions stored on the one or more computer readable storage media for execution by at least one of the one or more computer processors, the program instructions comprising the steps of:
      collecting an initial factory data;
      identifying and categorizing one or more shop floor activities;
      creating a digital twin copy of the factory;
      detecting a failure in the manufacturing process;
      in response to detecting a failure in the manufacturing process, determining an initial recovery process;
      performing one or more initial simulation scenarios with the digital twin copy, wherein the one or more initial simulation scenarios includes an initial recovery process;
      generating one or more initial factory recovery plans based on the one or more initial recovery process and the one or more initial simulation scenarios;
      executing the one or more factory recovery plans;
      collecting a subsequent factory data;
      updating the digital twin copy of the factory based on the subsequent factory data;
      performing one or more subsequent scenarios based on the subsequent factory data;
      creating one or more subsequent factory recovery plans based on the one or more subsequent scenarios; and
      executing a first recovery plan and a second recovery plan of the one or more subsequent factory recovery plans, wherein the second recovery plan comprising:
         detecting faulty machines or subsystems that are beyond repair; and
         initiating replacements of the faulty machine or subsystems.

16. The computer system of claim 15, wherein a first recovery plan of the one or more subsequent factory recovery plans comprises of analyzing the rate of recovery of the activity by different machinery or subsystems, and accordingly splitting the activity and distributing it or parallelizing sequences among multiple machines so that the aggregated recovery time can be minimized.

17. The computer system of claim 15, wherein the one or more shop floor activities further comprises assembly line activities performed by individual workers on each machine, maintenance of machines on the shop floor, loading raw materials into the machines and unloading finished goods at far end machine of the process.

18. The computer system of claim 15, wherein the one or more initial factory recovery plans further comprises, i) tracking the actual activity failures, recovery times and accordingly dynamically redistributing the activities to different machinery or subsystems, so as to ensure quicker overall completion time of all activities and ii) staging recovery when failures occur during intermediary stages of manufacturing or building products.

19. The computer system of claim 15, wherein program instructions to determine initial recovery process further comprises:
   identifying factors which can affect the shop floor activities and causes for failures;
   analyzing the failures based on historical data associated with the shop floor activities; and
   predicting the failures using classification and regression trees/random forest algorithm.

20. The computer system of claim 15, wherein the one or more initial simulation scenarios further comprises, identify machinery or subsystems where the activities to be recovered are performed, identifying the set of activities to be performed by various machinery or subsystems and detecting intermediary parts that are unusable from a failed activity and will recycle them as raw materials to minimize wastage in the manufacturing cycle.

* * * * *